United States Patent [19]

Raab et al.

[11] Patent Number: 4,569,430

[45] Date of Patent: Feb. 11, 1986

[54] CLUTCH DISC FOR A MOTOR VEHICLE FRICTION CLUTCH

[75] Inventors: Harald Raab, Schweinfurt; Hilmar Göbel, Schwebenried; Bernhard Schierling, Kürnach, all of Fed. Rep. of Germany

[73] Assignee: Fichtel & Sachs AG, Schweinfurt, Fed. Rep. of Germany

[21] Appl. No.: 524,088

[22] Filed: Aug. 17, 1983

[30] Foreign Application Priority Data

Aug. 18, 1982 [DE] Fed. Rep. of Germany ....... 3230664

[51] Int. Cl.$^4$ ............................................... F16D 3/14
[52] U.S. Cl. .............................. 192/106.2; 192/70.17; 464/68
[58] Field of Search ............... 192/70.17, 106.2, 106.1; 464/68

[56] References Cited

U.S. PATENT DOCUMENTS

| | | | |
|---|---|---|---|
| 3,327,820 | 6/1967 | Maurice | 192/106.2 X |
| 3,982,617 | 9/1976 | Worner | 192/106.2 |
| 4,044,874 | 8/1977 | Worner | 192/106.2 |

FOREIGN PATENT DOCUMENTS

| | | |
|---|---|---|
| 2318907 | 10/1974 | Fed. Rep. of Germany . |
| 3104181 | 12/1981 | Fed. Rep. of Germany . |
| 3323280 | 2/1984 | Fed. Rep. of Germany . |

*Primary Examiner*—Stephen F. Husar

*Attorney, Agent, or Firm*—Toren, McGeady, Stanger, Goldberg & Kiel

[57] ABSTRACT

The clutch disc for a motor vehicle friction clutch includes a hub (3) having a radially protruding hub flange (7), and two side plates (9, 11) rigidly connected together and limitedly rotatably mounted on the hub (3) on axially opposite sides of the hub flange (7). Compression springs of a torsion spring damper are arranged in windows of the hub flange (7) and of the side plates (9, 11). An idling operation friction damper (51, 59) and a load operation friction damper (99, 103, 105, 107) are arranged between the two side plates (9, 11). A control element (29) renders the two friction dampers effective in alternation. The control element (29) comprises two ring parts (31, 33) connected to rotate with one another. A friction ring (51) and a presser spring (59) of the idling friction damper are accommodated between the two ring parts (31, 33). Friction rings (61, 65) and a pressure spring (71) of the load friction damper are located between the side plates (9, 11) and the ring parts (31, 33) of the control element (29). The spring (71) of the load friction damper is stronger than the spring (59) of the idling friction damper. Likewise the friction torque of the load friction damper is greater than that of the idling friction damper. The control element is supported through a control spring (23') on the side plates (9, 11). The distance lugs (35) limit the rotating travel of the control element (29) in relation to the hub flange.

10 Claims, 5 Drawing Figures

CLUTCH DISC FOR A MOTOR VEHICLE FRICTION CLUTCH

BACKGROUND OF THE INVENTION

The invention relates to a clutch disc for a motor vehicle friction clutch and especially a clutch disc having a torisonal vibration damper.

STATEMENT OF PRIOR ART

A clutch disc of this kind is known from German Publication Specification No. 2,318,907. It comprises a hub with a radially protruding annular hub flange and two side plates arranged on both sides of the hub flange and connected with one another to form one rigid unit. The side plates are firmly connected with clutch friction linings and mounted on the hub rotatably through a limited angle of rotation in relation to the hub flange. Compression springs of a spring damper and at least two friction dampers are interposed into the torque transmission path between the side plates and the hubs. One of the two friction dampers is dimensioned for the idling operational condition of the motor vehicle clutch while the other of the two friction dampers is dimensioned for the condition of operation under load. The two friction dampers are set in action alternately by a control element in dependence upon the torque transmitted by the clutch disc. The control element is arranged in the frictional-torque-transmitting force path of the idling operation friction damper and is is supported on at least one of the damping compression springs of the spring damper. Stop elements on the control element limit the idle rotation travel of the control element in relation to the hub flange.

OBJECT OF THE INVENTION

It is the object of the invention to improve a clutch disc of the kind as explained above so that it is especially compact in the axial direction and displays a high operating and functional reliability, especially with regard to its idling operation friction damper. Moreover the clutch disc should have as few parts as possible which protrude from the compact contour.

SUMMARY OF THE INVENTION

In the clutch disc according to the invention suitable for a motor vehicle friction clutch, the control element which sets the idling operation friction damper and the loaded operation friction damper in action alternately comprises two ring parts enclosing the hub and arranged on axially opposite sides of the hub flange. The ring parts are arranged axially movably in relation to the hub flange and supported on one another by means of axial distance members which pass through windows of the hub flange. The idling operation friction damper is arranged axially between the two ring parts, while the loaded operation friction damper is arranged axially between the side plates and the respective adjacent ring parts. The ring parts are preferably connected fast in rotation, possibly even rigidly, with one another and protect the more delicate idling operation friction damper. The axial space on both sides of the hub flange, necessary in any case for the damping compression springs, is utilised for the components of the idling operation friction damper, so that axially compact clutch discs result.

The distance members are preferably lugs formed integrally on one of the ring parts and protruding axially from the ring part, which engage without play with end noses in windows of the other ring part. The lugs can be used at the same time to limit the idle rotation travel of the control element in relation to the hub flange.

Each of the two friction dampers expediently comprises a separate, axially acting compression spring which generates the axial friction force of the friction damper. The compression spring allocated to the loaded operation friction damper is preferably dimensioned for a greater axial spring force than the compression spring of the idling operation friction damper. In this way the side plates together with the control element are oriented axially on the hub flange exclusively by the compression spring allocated to the idling operation friction damper. Variations of friction force of the loaded operation friction damper have no effect upon the idling operation friction damper.

BRIEF DESCRIPTION OF DRAWINGS

Examples of embodiment of the invention are to be explained in greater detail hereinafter by reference to drawings, wherein.

DESCRIPTION OF PREFERRED EMBODIMENTS

Figure 1:
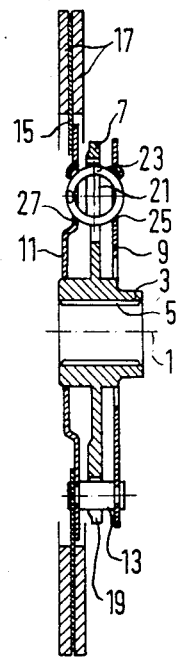
FIG. 1 shows a sectional view of a clutch disc with torsional vibration damper.

FIG. 1 shows a clutch disc of a motor vehicle friction clutch having a hub 3 defining a rotation axis 1, which is arranged by means of an internal toothing 5 fast in rotation but axially displaceably on an input shaft (not shown) of a transmission. The hub 3 comprises an annular hub flange 7 protruding radially and perpendicularly to the rotation axis 1. Axially on both sides of the hub flange there are arranged cover plates 9, 11 of annular disc form which are rigidly connected with one another by a plurality of distance rivets 13 distributed in the circumferential direction, and are mounted as a unit rotatably on the hub 3. A friction lining carrier plate 15 with clutch friction linings 17 is fitted in the usual way on the cover plate 11. The distance rivets 13 pass through slots 19 on the circumference of the hub flange 7 and limit the angle of rotation of the cover plates 9, 11 in relation to the hub flange 7. In each of several windows 21 of the hub flange 7, distributed in the circumferential direction, there are seated helical compression springs 23 which engage in corresponding windows 25, 27 of the cover plates 9, 11 and are subjectable to compression stress in the relative rotation of the cover plates 9, 11 and of the hub flange 7. The compression springs 23 form a torsional spring damper. In the space radially within the compression springs 23 a friction damper for the idling operational condition and a friction damper for the loaded operational condition of the clutch disc are arranged between the cover plates 9, 11. For the sake of clarity the friction dampers are omitted in FIG.

1, and will be explained hereinafter with reference to FIGS. 2 to 5.

Figure 2:
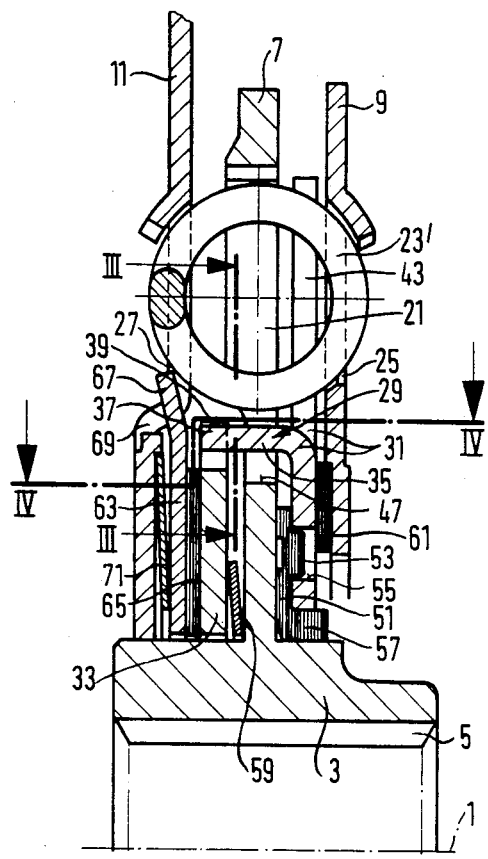
FIG. 2 shows a detail view of the clutch disc according to FIG. 1, with an additionally illustrated first form of embodiment of friction dampers.
Figure 3:
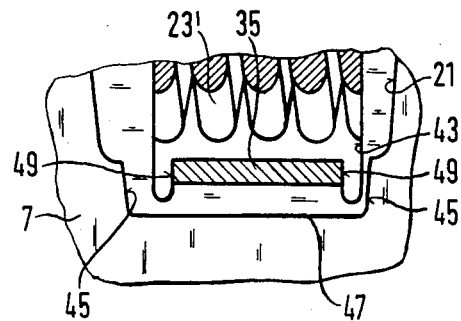
FIG. 3 shows a sectional view through the clutch disc according to FIG. 2, along a line III—III.
Figure 4:
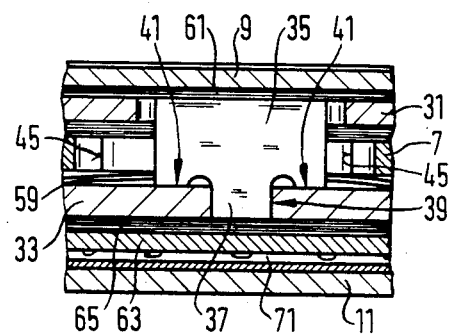
FIG. 4 shows a sectional view through the clutch disc according to FIG. 2, along a line IV—IV.

FIGS. 2 to 4 show the clutch disc according to FIG. 1 with a first form of embodiment of the friction dampers. Axially between the cover plates 9, 11 a control cage 29 is mounted rotatably on the hub 3. The control cage 29 controls the operation of the idling friction damper and of the load friction damper in dependence upon the torque transmitted through the clutch disc. It comprises two ring parts 31, 33 arranged axially on both sides of the hub flange 7 and annularly enclosing the hub 3, which are supported axially on one another by axially bent-off lugs 35 formed integrally on the ring part 31. As may best be seen from FIG. 4, at their free ends the lugs 31 carry noses 37 which engage in windows 39 of the ring part 33 preferably without play, possibly even with press fit. The ring part 31 comprises a plurality of these lugs 35 which are arranged in distribution in the circumferential direction and guide the ring part 33 radially. Axial shoulders 41 on which the ring part 33 is supported are formed on each lug 35 in the circumferential direction on both sides of each of the noses 37. Alternatively the lugs 35 can also be formed integrally on the ring part 33, in which case their noses then engage in corresponding manner in windows of the ring part 31.

The control cage 29 is controlled by at least one of the damping compression springs supported in the windows 25, 27 of the cover plates 9, 11. In FIG. 2 this control compression spring is designated by 23'. As may best be seen from FIG. 3, the control compression spring 23' is seated in a window 43 of a radial flange or annular zone of the ring part 31, in such a way that, at least within the operational range intended for the idling friction damper, it can move over an idling rotation travel in relation to the window 21 of the hub flange 7. The idle rotation travel of the control cage 29 is fixed by stop faces 45 of a window 47 in the hub flange 7. The stop faces 45 co-operate with the edges 49, facing in the circumferential direction, of the lug 35 passing through the window 47.

The idling friction damper comprises axially between the hub flange 7 and the ring part 31, a friction ring 51 which annularly encloses the hub 3. The friction ring 51 is fixed fast in rotation on the ring part 31 with axial extensions 53 which engage in openings 55 of the ring part 31. The friction ring 51 is further provided integrally with an annular projection 57 protruding axially in relation to the ring part 31 and mounted rotatably on the hub 3. The ring part 31 is mounted rotatably on the hub 3 by means of the annular projection 57. Between the hub flange 7 and the ring part 33 a dished spring 59 is clamped in and determines the axial pressure application force of the idling friction damper.

The load friction damper comprises a friction ring 61 arranged axially between the cover plate 9 and the ring part 31 and guided radially on the cover plate 9, and a further friction ring 65 arranged between the ring part 33 and a presser plate 63 which annularly encloses the hub 3. The presser plate 63 is arranged axially between the ring part 33 and the cover plate 11 and carries noses 67 on its external circumference which engage in openings 69 of the cover plate 11 and guide the presser plate 63 fast in rotation but axially displaceably on the cover plate 11. A further dished spring 71 which annularly encloses the hub 3 similarly to the dished spring 59 is arranged axially between the presser plate 63 and the cover plate 11. The dished spring 71 generates the pressure application force of the load friction damper and is more stoutly dimensioned than the dished spring 59, so that when the ring part 33 is guided axially loosely on the lugs 35 the spring 71 presses the ring part 33 upon the shoulders 41 of the lugs 35, against the force of the dished spring 59. Furthermore the friction torque generated by the friction rings 61, 65 of the load friction damper is greater than the friction torque of the idling friction damper generated by the friction ring 51.

In the idling range, that is with a low degree of irregularity and low torque to be transmitted by the clutch disc, the relative rotation between the cover plates 9, 11 on the one hand and the hub flange 7 on the other is also slight. As long as the lugs 35 of the control cage 29 are freely movable in their windows 47 of the hub flange 7, in a rotation in relation to the hub flange 7 the cover plates 9, 11 entrain the control cage 29, through the friction rings 61, 65 of the load friction damper. The control cage 29, including the friction ring 51 connected fast in rotation with it, here rotates in relation to the hub flange 7. The damping action is thus determined exclusively by the friction force of the idling friction damper.

In the case of a greater torque to be transmitted by the clutch disc, or in the case of a greater degree of irregularity, the edges 49 of the lugs 35 come to abut on the stop faces 45 of their windows 47. Thus in addition to the damping springs 23, which were already effective in idling operation between the cover plates 9, 11 and the hub flange 7, the control damping spring 23' is also brought into action. The control damping spring 23' in this case is charged with pressure between the cover plates 9, 11 on the one hand and the control cage 29 supported on the hub flange 7. As long as the lugs 35 abut on the stop faces 45 of the windows 47, the idling friction damper is out of action and the load friction damper exclusively is effective. The cover plates 9, 11 can move in relation to the control cage 31 and the friction force is determined exclusively by the friction rings 61, 65.

If the direction of movement of the cover plates 9, 11 reverses in relation to the hub flange 7, the control damping spring 23' at first holds the control cage 29 at rest in relation to the hub flange 7. The initial stress force of the control damping spring 23' determines the change-over torque between the torque operation ranges of the idling friction damper and the load friction damper. Without the control damping spring 23' the control cage 29 would be entrained in the return movement of the cover plates 9, 11 by reason of the greater friction force of the load friction damper, whereby the friction damping would be determined exclusively by the idling friction damper.

The cover plates 9, 11 are adjusted in the axial direction in relation to the control cage 29 by the dished spring 71. The dished spring 59 adjusts the entire unit in relation to the hub flange 7. Since all components of the idling friction damper are accommodated in protected manner within the control cage 29, the clutch disc is secure in operation. Moreover it is axially compact and has no parts protruding substantially beyond the nearly plane surface of the cover plates 9, 11.

Figure 5:
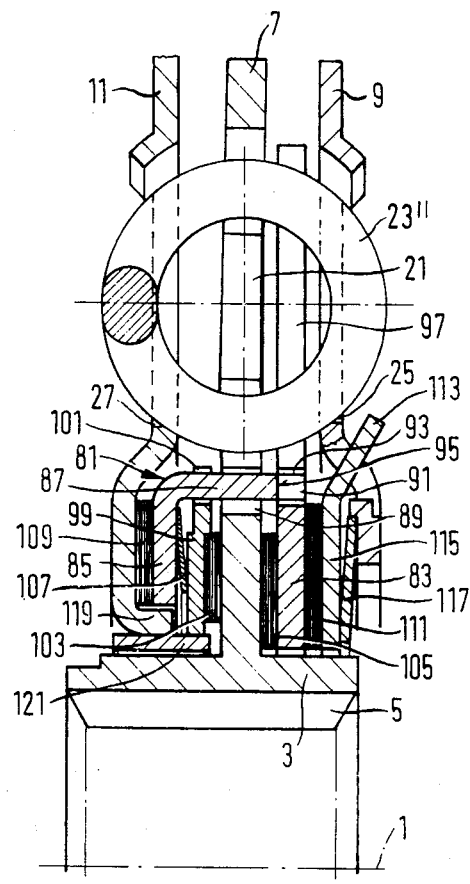
FIG. 5 shows a detail view of the clutch disc according to FIG. 1, with an additionally illustrated second form of embodiment of friction dampers.

FIG. 5 shows a detail view of the clutch disc according to FIG. 1 with a different form of embodiment of an idling friction damper and of a load friction damper. Parts already explained with reference to FIG. 1 are designated by the same reference numerals. To this extent reference is made to the description of FIG. 1.

The alternate operation of the idling friction damper and of the load friction damper is again controlled by a control cage 81 which is mounted rotatably on the hub 3 in a manner explained hereinafter. The control cage again comprises two ring parts 83, 85 arranged on axially opposite sides of the hub flange 7, which ring parts are connected fast in rotation with one another and supported axially on one another through axially bent-off lugs 87 formed integrally on the ring part 85. The lugs 87 here pass through windows 89 of the hub flange 7 and carry noses 91 on the free ends which engage without play in windows of the ring part 83. The supporting takes place through axial stop faces 95 provided on both sides of the noses 91 in the circumferential direction, upon which faces the ring part 83 bears axially. The lugs 87 limit the angle of rotation of the control cage 81 in relation to the hub flange 7, in that after overcoming an idle rotation distance they abut on the faces of the windows 89 allocated to them which face in the circumferential direction. A control damping spring 23″ couples the control cage 81 elastically with the cover plates 9, 11. Its spring force determines the working ranges of the idling friction damper and the load friction damper, as explained for the control damping spring 23′ by reference to FIGS. 2 to 4. The control damping spring 23″ is stressed for this purpose in a window 97 of the ring part 83.

While in the clutch disc according to FIGS. 2 to 4 a relative rotation takes place between the dished spring 59 on the one part and the hub flange 7 or the ring part 33, in the idling friction damper of the clutch disc according to FIG. 5 this is prevented by a presser plate 99 arranged between the ring part 85 and the hub flange 7. The presser plate 99 is guided fast in rotation but axially displaceably on the lugs 87 and for this purpose has windows 101 on its external circumference. Axially between the hub flange 7 and the annular presser plate 99 there is arranged a friction ring 103 which annularly encloses the hub 3. A further friction ring 105 is provided axially between the hub flange 7 and the ring part 83. An annular dished spring 107 braced in between the presser plate 99 and the ring part 85 generates the friction force initial stress of the idling friction damper formed by the friction rings 103, 105.

The load friction damper comprises a friction ring 109 arranged between the cover plate 11 and the ring part 85 and enclosing the hub 3 and a further friction ring 111 between the ring part 83 and a presser plate 115 which is guided fast in rotation but axially displaceably on the cover plate 9 by means of noses 113. The presser plate 115 in turn is arranged axially between the friction ring 111 and the cover plate 9 and is pressed against the friction ring 111 by a dished spring 117 braced axially between the presser plate 115 and the cover plate 9 and annularly enclosing the hub 3. The axial spring force of the dished spring 117 is greater than the axial spring force of the dished spring 107. Likewise the friction torque generated by the load friction damper is greater than the friction torque of the idling friction damper.

The cover plate 11 of substantially annular disc form is provided on its internal periphery with a crimping 119 protruding axially towards the hub flange 7 and into which a bearing sleeve 121 is pressed. The bearing sleeve 121 protrudes in the axial direction towards the hub flange 7 beyond the crimping 119. The presser plate 99 of the idling friction damper is mounted radially on the bearing sleeve 121. Since the lugs 87 are guided radially in the openings 101, the bearing sleeve 121, through the presser plate 99, at the same time also guides the control cage 81.

Incidentally the components 81 to 87 of FIG. 5 correspond to the components 29 to 35 of FIGS. 2 to 4, the component 89 corresponds to the component 47, the components 91 to 97 to the components 37 to 43 and the components 105 to 117 in sequence to the components 51, 59, 61, 65, 67, 63 and 71. For further explanation of the assembly and especially of the manner of operation therefore reference is made to the description of FIGS. 2 to 4.

I claim:

1. A clutch disc for a motor vehicle friction clutch, comprising:
   (a) a hub having a rigidly radially protruding annular hub flange, the hub defining a rotation axis of the clutch dis;
   (b) two side plates on axially opposite sides of the hub flange which are rigidly connected with one another and mounted rotatably on the hub as a unit about the rotation axis through a limited angle of rotation in relation to the hub flange;
   (c) at least two friction dampers effective in the relative rotation of the hub flange and of the side plates, including a first said friction damper dimensioned for idling operation and a second said friction damper dimensioned for loaded operation;
   (d) a control element annularly enclosing the hub, which element is rotatable through a limited idle rotation distance in relation to the hub flange and is arranged in the friction-torque-transmitting force path of one of the friction dampers;
   (e) stop elements on the control element and on one of the hub flange and the hub, which limit the relative rotation distance of the hub flange and of the control element;
   (f) at least one damping compression spring which is held in windows of the hub flange and the side plates and is stressable in the relative rotation of the hub flange and of the side plates;
   (g) at least one control compression spring held in windows of the control element and of the side plates and stressable on relative rotation of the control element and of the side plates;
   (h) clutch friction linings connected with the side plates for rotation therewith;
said control element comprising two ring parts enclosing the hub and arranged axially movably in relation to the hub flange on axially opposite sides of the hub flange, said ring parts being supported on one another through axial distance members, which pass through windows of the hub flange, said idling operation friction damper being arranged axially between the two ring parts, and said load operation friction damper being arranged axially between the side plates and the respectively adjacent ring parts.

2. A clutch according to claim 1, wherein the distance members are formed as lugs formed integrally on one of the ring parts, wherein the lugs each comprise noses on their ends which engage, transversely of the axis of rotation without play in windows of the other ring part, and wherein the lugs comprise, in the region of their ends, axial shoulders by way of which they are supported on the other ring part.

3. A clutch according to claim 2, wherein the stop elements are formed by the lugs and the windows, respectively allocated to them, of the hub flange, through which they pass.

4. A clutch according to claim 1, wherein the idling operation friction damper comprises a friction ring arranged axially between one of the two ring parts and the hub flange and enclosing the hub and an axially acting compression spring arranged axially between the other of the two ring parts and the hub flange.

5. A clutch according to claim 4, wherein the friction ring comprises on its radially inner periphery an annular flange mounted on the hub and protruding axially to the adjacent ring part, on which flange the adjacent ring part is rotatably mounted.

6. A clutch according to claim 4, wherein a presser plate annularly enclosing the hub and guided for rotation with but axially displaceably on the adjacent ring part is arrranged axially between the compression spring and the hub flange and a further friction ring enclosing the hub is arranged axially between the presser plate and the hub flange.

7. A clutch according to claim 6, wherein the presser plate is mounted rotatably on the hub, wherein the stop elements are guided for displacement transversely thereof but without play on the presser plate, and wherein the ring parts are connected with one another without play at least transversely of the axis of rotation.

8. A clutch according to claim 7, wherein on the side plate arranged together with the presser plate on the same axial side of the hub flange there is held a bearing ring which is mounted on the hub, protrudes axially to the presser plate, and on which the presser plate is mounted.

9. A clutch according to claim 4, wherein the load operation friction damper comprises a friction ring arranged axially between one of the two side plates and the ring part, adjacent to this side plate, of the control element, and an axially acting compression spring arranged axially between the other of the two side plates and the ring part, adjacent to this other side plate, of the control element, and wherein the axially acting compression spring of the load operation friction damper is stronger than the axially acting compression spring of the idling operation friction damper.

10. A clutch according to claim 1, wherein the load operation friction damper comprises:
 (a) a friction ring arranged axially between one of the two side plates and the ring part, adjacent to this side plate, of the control element;
 (b) an axially acting compression spring arranged axially between the other of the two side plates and the ring part, adjacent to this other side plate, of the control element;
 (c) a presser plate arranged axially between the compression spring and the ring part, adjacent to it, and annularly enclosing the hub, which presser plate is guided for rotation with but axially displaceably on this other of the two side plates; and
 (d) a further friction ring enclosing the hub and arranged axially between the presser plate and the ring part, adjacent to it, of the control element.

* * * * *